United States Patent [19]

Owaki

[11] Patent Number: 5,226,955
[45] Date of Patent: Jul. 13, 1993

[54] POLISHING COMPOSITION FOR MEMORY HARD DISC

[75] Inventor: Toshiki Owaki, Aichi, Japan

[73] Assignee: Fujimi Incorporated, Aichi, Japan

[21] Appl. No.: 946,908

[22] Filed: Sep. 18, 1992

[30] Foreign Application Priority Data

May 6, 1992 [JP] Japan .................. 4-113660

[51] Int. Cl.$^5$ .................. C09G 1/00
[52] U.S. Cl. .................. 106/3; 51/309; 106/286.5; 106/287.17; 423/365
[58] Field of Search .................. 51/309; 106/3, 286.5, 106/287.17; 423/365

[56] References Cited

U.S. PATENT DOCUMENTS

| | | | |
|---|---|---|---|
| 4,426,366 | 1/1984 | McCandlish et al. | 51/309 |
| 4,476,102 | 10/1984 | McCandlish et al. | 51/309 |
| 4,696,697 | 9/1987 | Kitano et al. | 106/3 |
| 4,705,566 | 11/1987 | Senda et al. | 106/3 |
| 4,769,046 | 9/1988 | Senda et al. | 51/293 |

FOREIGN PATENT DOCUMENTS 1-97560  4/1989 Japan .
1-97561  4/1989 Japan .
1-257563 10/1989 Japan .

*Primary Examiner*—Mark L. Bell
*Assistant Examiner*—Willie J. Thompson
*Attorney, Agent, or Firm*—Abelman Frayne & Schwab

[57] ABSTRACT

A polishing composition for memory hard discs used to obtain polished surfaces of a high precision and a high quality with a high stock removal rate. The composition consists of water, alumina polishing agent, and polishing accelerator, and polishes surfaces of alumite, aluminum, and non-electrolytically nickel plated memory hard discs. The polishing accelerator is one kind selected from the group of molybdate of ammonium molybdate, lithium molybdate, sodium molybdate and potassium molybdate, or a kind selected from the group of molybdate and aluminum salt such as aluminum nitrate or aluminum oxalate, or another one kind selected from the group of molybdate and nickel sulfate, nickel nitrate, nickel sulfamate, and nickel acetate. The addition quantity of the substance above is 0.1 to 20%, the weight ratio of the polishing agent is 2 to 30%, and the mean particle diameter is 0.3 to 10 μm.

6 Claims, No Drawings

POLISHING COMPOSITION FOR MEMORY HARD DISC

FIELD OF THE INVENTION

The present invention relates to compositions for polishing memory hard discs and, in particular, polishing compositions used to polish quickly and effectively surfaces of magnetic disc substrates or memory hard discs which have been used as an auxiliary storage of a computer system obtaining mirror faces of the surfaces of the magnetic disc substrates.

PRIOR ART

Nowadays, according to the recent trend of the memory hard discs used in the magnetic recording apparatus, they are becoming of a large capacity and a high storage density. Consequently, magnetic media are changing from that of coating type to that of thin film type manufactured by a spattering method and a plating method. In addition, with an advance of such high density, a gap between the memory hard disc and a magnetic head, or a flying height of the head becoming smaller and smaller. Recently, the gap is less than 0.2 $\mu$m. As described above, because the head flying height is very small, head crush is apt to be happened if the memory hard disc has a protrusion or protrusions on its surface. Head crush means contact or collision between a magnetic head surface and protrusion(s) formed on the disc surface damaging the magnetic media or magnetic head. Any minute protrusions which might extend no hard crush with a magnetic head, tend to cause various errors in reading or writing of information by virtue of a disturbance of magnetic characteristic of the magnetic media around the protrusions. Hence, it is important to prevent such protrusions from forming on the memory hard disc substrate before a magnetic medium is formed thereon. The protrusions are apt to be formed or manufactured in a polishing step of the memory hard disc substrate.

The conventional polishing composition used by the memory hard discs is a polishing slurry of aluminum oxide (alumina) polishing agent suspended in water, or a polishing slurry of composition of water, alumina polishing agent and polishing accelerator of aluminum nitrate, nickel sulfate, or nickel sulfamate.

The applicant of the present invention disclosed in Patent Publication 2(1990)-23589 a polishing composition for memory hard discs consisting of polishing agent of water and aluminum oxide (alumina) and a polishing accelerator in order to polish surfaces of non-electrolytically nickel plated memory hard discs, of alumite or aluminum, wherein the polishing accelerator is a kind of nickel nitrate or aluminum nitrate, or two kinds of nickel nitrate or nickel sulfate and aluminum nitrate, and disclosed in Patent 64-436 a polishing composition consisting of polishing agent of water and aluminum oxide (alumina), and a polishing accelerator of nickel sulfate, wherein the polishing composition is of neutrality or weak acid.

Further, an official gazette of Patent Application Laid-open 1(1989)-97560 discloses an aluminum magnetic disc polishing composition consisting of aluminum polishing powder, nickel sulfamate, and water.

Again, it is necessary nowadays to make the memory hard discs further of higher storage density and to manufacture polished surfaces of the hard discs of a high quality without micro protrusions formed thereon. In order to reduce a manufacturing cost of the hard discs, it is demanding of a polishing composition of a productivity and workability, respectively of higher than these of the prior art.

SUMMARY OF THE INVENTION

It is the purpose of the present invention provide a polishing composition of a high stock removal rate, which is enabling to obtain polished surfaces of a precision and a quality, respectively of so high that satisfying these demands of the field.

DETAILED EXPLANATION OF THE INVENTION

The polishing composition of the present invention will be described in detail.

It is noted that the present invention's polishing composition consists of water, alumina polishing agent, and a polishing accelerator so as to polish surfaces of non-electrolytically nickel plated memory hard discs, alumite or aluminum, wherein the polishing accelerator contains a kind of molybdate, or molybdate and aluminum salt, or molybdate and nickel salt.

The molybdate of the polishing accelerator is one selected from the group consisting of ammonium molybdate, lithium molybdate, sodium molybdate, and potassium molybdate.

The aluminum salt mentioned above is aluminum nitrate or aluminum oxalate, and the nickel salt is one selected from the group of nickel sulfate, nickel nitrate, nickel sulfamate, and nickel accetate.

In addition, the weight ratio of the polishing accelerator above is 0.1 to 20%, the weight ratio of the polishing agent is 2 to 30%, and a mean diameter of particle of the polishing agent is 0.3 to 10 $\mu$m.

An operation of the present invention will be described. According to the polishing composition for memory hard discs having such composition above, when the surfaces of the hard disc are polished by the polishing composition, polishing accelerating agent contained in the composition carries out so-called mechanical/chemical polishing operation with a stock removal rate higher than that obtained by the conventional polishing composition. By a combination of chemical effect and mechanical effect having polishing accelerating effect, it is possible to obtain memory hard discs provided their polished surfaces having few micro protrusion and attain a high quantity polished surfaces of a high precision which is necessary to satisfy the recent demand of high storage density.

When molybdate is added to the conventional polishing composition consisting of various aluminum salt and nickel salt, it is possible not only to reduce micro protrusions but also to improve dispersion ability and liquidity of the slurry. In addition, a so-called caking phenomenon of precipitating and hardening powder part of the slurry in a slurry tank used during a polishing step or a product container is solved. That is, the slurry is easily dispersed during it is used by resulting in few phenomenon of clogging the polishing pad. Apparently, it is advantageously possible to considerably reduce number of dressing operation of the polishing pad.

It is necessary to add the polishing accelerator more than 0.1% at a weight ratio in order to raise a stock removal rate and polishing performance for the memory hard disc. Even when it is over 20% at a weight ratio with consuming much material, the stock removal rate is not improved more. It is not economical polishing method and 1 to 20% of a weight ratio is preferable.

When a mean diameter of particles of the polishing agent is less than 0.3 μm, the stock removal rate of the product lowers. When it is more than 10 μm, it is impossible to attain a polished surface of high quality. The mean diameter of 0.3 to 10 μm is preferable.

It is necessary to use a polishing agent of a weight ratio of more than 2% to raise stock removal rate and polishing performance of the agent. No improvement is recognized when the weight ratio is more than 30% consuming wastefully and uneconomically material of the composition. A weight ratio of 2 to 30% is preferable.

The polishing composition for memory hard discs according to the present invention has a polishing efficiency higher than that of the conventional polishing composition, carries out combinations of chemical effect and mechanical effect of polishing accelerating effect obtaining polished surfaces provided with few micro protrusions and attaining polished surfaces of a high precision and high quality which are necessary to the present demand of a high storage density on the memory hard disc.

Also, according to the polishing composition of the present invention, it has good dispersionability and good liquidability of the polishing composition slurry, so-called caking phenomenon, which is apt to happen in the product container of the polishing composition when it is used to carry out polishing operations, is solved, the slurry will be easily dispersed by resulting in no clogging of the polishing pad. As a result, a repeating number of dressing the polishing pad is considerably reduced.

EMBODIMENTS

The embodiments of the polishing composition according to the present invention will be described.

EMBODIMENT 1

The polishing compositions of the present inventions (1) to (8) were composed by adding 0.1 to 30.0% at a weight percent of ammonium molybdate $(NH_4)_6Mo_7O_{24}.4H_2O$ to the slurry containing 10 weight % of alumina powder ($\alpha$-$Al_2O_3$) of particles of the mean diameter 0.8 μm. A conventional polishing composition (1) of the slurry above without the ammonium molybdate $(NH_4)_6Mo_7O_{24}.4H_2O$ was prepared and used as a comparison sample with the present invention.

A polishing test of the polishing compositions of the present inventions and the comparison was carried out with the polishing machine and the polishing conditions mentioned below. The results of the test are shown in the Table 1.

polishing machine: double sided polishing machine (9B type)
polishing pad: suede type polishing pad
disc: five non-electrolytically nickel phosphorus plated discs, 3.5"φ
polishing time: polished for five minutes
plate rotation: 60 rpm (lower plate)
pressure: 100 g/cm$^2$
slurry feed rate: 100 ml/min A quality characteristics of the polished surface was evaluated by the mean number of micro protrusions per visual field of a differential interference microscope. The number of protrusions were counted at twelve (12) points of the polished surface under visual microscopic focus of 400 magnification.

TABLE 1

|  | added quantity of ammonium molybdate (wt. %) | stock removal rate (μm/min) | mean number of protrusion (number/visual field) |
|---|---|---|---|
| Conventional (1) | None | 0.74 | 19.2 |
| Invention (1) | 0.1 | 0.89 | 2.2 |
| Invention (2) | 0.5 | 1.18 | 0.08 |
| Invention (3) | 1.0 | 1.36 | 0.08 |
| Invention (4) | 5.0 | 1.93 | less than 0.08 |
| Invention (5) | 10.0 | 1.85 | less than 0.08 |
| Invention (6) | 15.0 | 1.50 | less than 0.08 |
| Invention (7) | 20.0 | 1.26 | less than 0.08 |
| Invention (8) | 30.0 | 1.09 | less than 0.08 |

As apparently shown in the table 1, the polishing compositions (1) to (8), respectively have the stock removal rate higher than that of the conventional composition, and the numbers of protrusion considerably fewer than that of the conventional one.

EMBODIMENT 2

The polishing compositions (11) to (16) according to the present invention were respectively prepared by blending 5 weight % of the polishing accelerators having the various molecular formulas shown in the table 2 and 1.0 weight % of ammonium molybdate, and the conventional polishing compositions (2) to (7), which the polishing accelerators of 5 weight % were prepared without adding the ammonium molybdate. These compositions were tested with the polishing machine under the polishing conditions identical with that of the embodiment 1 above. Stock removal rate, the mean number of protrusions, the caking characteristic or phenomenon, and clogging characteristic or phenomenon, respectively of the polishing characteristics of the conventional polishing compositions (2) to (7) and the present invention's polishing compositions (11) to (16) were compared to each other. The results of the polishing tests above are shown in the table 3.

TABLE 2

| polishing accelerator | molecular formula |
|---|---|
| ammonium molybdate | $(NH_4)_6Mo_7O_{24}.4H_2O$ |
| potassium molybdate | $K_2MoO_4$ |
| sodium molybdate | $Na_2MoO_4.2H_2O$ |
| lithium molybdate | $LiMoO_4$ |
| aluminum nitrate | $Al(NO_3)_3.9H_2O$ |
| aluminum oxalate | $Al_2(C_2O_4)_3.nH_2O$ |
| nickel sulfate | $NiSO_4.6H_2O$ |
| nickel nitrate | $Ni(NO_3)_2.6H_2O$ |
| nickel acetate | $Ni(CH_3COO)_2.4H_2O$ |
| nickel sulfamate | $Ni(NH_2SO_3)_2.4H_2O$ |

TABLE 3

| polishing accelerator (weight ratio: 5 wt %) | weight ratio (%) of ammonium molybdate | stock removal rate (μm/min.) | mean number of protrusion (number/visual field) | caking and clogging characteristics |
|---|---|---|---|---|
| conventional |  |  |  |  |
| (2) aluminum nitrate | 0 | 1.81 | 4.2 | bad |

TABLE 3-continued

| polishing accelerator (weight ratio: 5 wt %) | weight ratio (%) of ammonium molybdate | stock removal rate ($\mu$m/min.) | mean number of protrusion (number/visual field) | caking and clogging characteristics |
| --- | --- | --- | --- | --- |
| (3) aluminum oxalate | 0 | 1.44 | 15.8 | bad |
| (4) nickel sulfate | 0 | 1.60 | 6.6 | bad |
| (5) nickel nitrate | 0 | 1.47 | 8.4 | bad |
| (6) nickel sulfamate | 0 | 1.53 | 16.6 | bad |
| (7) nickel acetate | 0 | 1.44 | 14.1 | bad |
| invention | | | | |
| (11) aluminum nitrate | 1.0 | 1.98 | 0.08 | good |
| (12) aluminum oxalate | 1.0 | 1.66 | 0.72 | good |
| (13) nickel sulfate | 1.0 | 1.71 | 0.24 | good |
| (14) nickel nitrate | 1.0 | 1.68 | 0.56 | good |
| (15) nickel sulfamate | 1.0 | 1.69 | 0.80 | good |
| (16) nickel acetate | 1.0 | 1.51 | 0.72 | good |

As shown in the table 3, the stock removal rate of the polishing compositions of the present inventions (11) to (16) are higher than that of the conventional ones (2) to (7), the numbers of protrusions of the present inventions exceedingly are fewer than that of the conventional, the caking characteristics and clogging characteristics of the present inventions are good, thus exhibiting that the polishing compositions of the present invention are excellent at all characteristics.

What is claimed is:

1. A polishing composition for polishing surfaces of a non-electrolytically nickel plated memory hard disc, of alumite and aluminum, which comprises: water, an alumina polishing agent, and a polishing accelerator, wherein said polishing accelerator is selected from the group consisting of a molybdate, a molybdate and an aluminum salt, or a molybdate and a nickel salt.

2. The polishing composition according to claim 1, wherein said molybdate is one selected from the group consisting of ammonium molybdate, lithium molybdate, sodium molybdate, and potassium molybdate.

3. The polishing composition according to claim 1, wherein the aluminum salt is aluminum nitrate or aluminum oxalate, and the nickel salt is one selected from the group consisting of nickel sulfate, nickel nitrate, nickel sulfamate, and nickel acetate.

4. The polishing composition according to claim 1, wherein the weight ratio of the polishing accelerator is 0.1 to 20%.

5. The polishing composition for the memory hard disc according to claim 1, wherein the weight ratio of the polishing agent is 2 to 30% and the mean particle diameter of the polishing agent is 0.3 to 10 $\mu$m.

6. The polishing composition according to claim 2, wherein the weight ratio of the polishing accelerator is 0.1 to 20%.

* * * * *